US007995181B2

(12) United States Patent
Choi et al.

(10) Patent No.: US 7,995,181 B2
(45) Date of Patent: Aug. 9, 2011

(54) HIGH SPEED AND WIDE VIEWING ANGLE LIQUID CRYSTAL DISPLAYS

(75) Inventors: Wing-Kit Choi, Orlando, FL (US); Shin-Tson Wu, Orlando, FL (US)

(73) Assignees: University of Central Florida Research Foundation, Inc., Orlando, FL (US); AU Optronics Corporation, Taoyuan (TW)

( * ) Notice: Subject to any disclaimer, the term of this patent is extended or adjusted under 35 U.S.C. 154(b) by 164 days.

(21) Appl. No.: 10/643,063

(22) Filed: Aug. 18, 2003

(65) Prior Publication Data
US 2005/0024548 A1 Feb. 3, 2005

Related U.S. Application Data

(60) Provisional application No. 60/405,999, filed on Aug. 26, 2002.

(51) Int. Cl.
G02F 1/1343 (2006.01)

(52) U.S. Cl. ........................... 349/141; 349/143

(58) Field of Classification Search .................. 349/141, 349/42–43, 139, 143
See application file for complete search history.

(56) References Cited

U.S. PATENT DOCUMENTS

| | | | |
|---|---|---|---|
| 5,978,059 A | 11/1999 | Ohta et al. | 349/141 |
| 6,111,627 A | 8/2000 | Kim et al. | 349/141 |
| 6,469,765 B1 * | 10/2002 | Matsuyama et al. | 349/143 |
| 6,819,384 B2 * | 11/2004 | Nakanishi et al. | 349/141 |
| 2001/0046027 A1 * | 11/2001 | Tai et al. | 349/159 |
| 2002/0089632 A1 | 7/2002 | Wong | 349/143 |

OTHER PUBLICATIONS

D. J. Channin, *Applied Physics Lettesr.* vol. 26, No. 11, p. 603 (1975).
D. J. Channin, *Applied Physics Letters*, vol. 28, No. 6 (1976).
Akihiko Sugimura, Proceedings of 14th Conference on Solid State Devides, Tokyo (1982).
Akihiko Sugimura, *Japanese Journal of Applied Physics*, vol. 24, No. 8 p. 905 (1985).
Seung Ho Hong, *Japanese Journal of Applied Physics*, vol. 40, p. L272, (2001).
Seung Ho Hong, *Japanese Journal of Applied Physics*, vol. 41, p. 4571-4576, (2002).
A Takeda, *SID '98*, p. 1077 (1998).
K. H. Kim, *SID '98*, p. 1085, (1998).
C. Y. Xiang, *Japanese Journal of Applied Physics*, vol. 42 pp. L763-L765, (2003).

* cited by examiner

*Primary Examiner* — Dung T. Nguyen
(74) *Attorney, Agent, or Firm* — Brian S. Steinberger; Phyllis K. Wood; Law Offices of Brian S. Steinberger, P.A.

(57) ABSTRACT

Novel structural configurations of a TFT-LCD (Thin Film Transistor Liquid Crystal Display) which results in both fast response to input data and provides wide-viewing-angles. The structure of the device is comprised of one pixel electrode layer and two common electrode layers. The structure of the invention can be used with liquid crystal display television (LCD-TV) monitors that require both fast-response as well as wide-viewing-angle. In addition, other liquid crystal technologies which require high speed response would benefit from the TFT-LCD of the present invention.

9 Claims, 9 Drawing Sheets

HIGH SPEED AND WIDE VIEWING ANGLE LIQUID CRYSTAL DISPLAYS

This invention claims the benefit of priority to U.S. Provisional Application No. 60/405,999 filed Aug. 26, 2002.

FIELD OF INVENTION

This invention relates to displays, in particular to methods and apparatus for providing a TFT-LCD (Thin Film Transistor Liquid Crystal Display) having fast responses to high input data rates and allowing for wide viewing angles for viewers.

BACKGROUND AND PRIOR ART

Slow response time and poor viewing angle of the conventional TFT-LCD are two of the major limitations for its otherwise potentially unlimited wide range of applications.

FIG. 1 shows the structure of a conventional TFT-LCD. A liquid crystal (LC) layer 10 is sandwiched between a top glass substrate 11 and a bottom glass substrate 12. A thin layer of transparent electrode, indium tin oxide (ITO), is coated on each substrate for the application of an electric field to switch the liquid crystals. Normally, the electrode 13 for the top substrate 11 is a common electrode, which has a constant voltage (e.g. 0V). 0V is used herein to mean low voltage. This common electrode is continuous and extends to all pixels in the whole display and hence is called a common electrode. On the other hand the electrode 14 on the bottom substrate 12 is called the pixel electrode since a transistor assigned to each individual pixel controls it. The voltage applied to the LC 10 is varied through this electrode. The electric field profile E is also shown in FIG. 1, when the pixel voltage is >0. As can be seen clearly there is only one type of electric field, a vertical field, for this device. This electric field is used to turn on the device by switching the liquid crystal molecules, which is a fast process. However, when we turn off the device, the pixel voltage is either removed or reduced such that the molecules gradually relax back to a lower state. With only one type of electric field generated, this results in a very slow relaxation and hence slow turn off time, and is a major limitation of liquid crystals for many potential applications today.

Discussed below are various relevant prior art references. The references are related to three key concepts used in the present invention: crossed-field effect, fringing field switching and multi-domain technology.

The concept of crossed-field effect first appeared in 1975 in an article by D. J. Channin, *Applied Physics Letters'*, Vol. 26, No. 11, p. 603 (1975) and in a subsequent article by D. J. Channin and D. E Carlson, *Applied Physics Letters'*, Vol. 28, No. 6 (1976). Six years later, an article was published by Akihiko Sugimura et al., *Proceedings of 14th Conference on Solid State Devices*, Tokyo (1982) and in 1985 Akihiko Sugimura and Takao Kawamura published another article in, *Japanese Journal of Applied Physics*, Vol. 24, No. 8, p. 905 (1985). The liquid crystal displays employing the crossed-field effect have various disadvantages, such as, high voltage requirement, low contrast, more complicated structure, non-uniform transmission, and more complicated driving. Driving refers to the electronic circuits used to supply (or drive) the required voltages (data or common) to the TFT-LCD. Some driving schemes are more complicated, e.g, requiring different types of voltage at different time intervals. In the crossed field effect, it normally requires the control of two types of electric field (both vertical and lateral) using extra electrodes and hence more complicated driving. The crossed-field effect concept has therefore not been used for TFT-LCDs since it tends to require much higher operation voltage, more complicated structure and driving and have lower contrast. The present invention however improves many of the above problems by using different electrode designs; thus, making the crossed-field effect possible for use in TFT-LCDs. Moreover, the use of the crossed-field effect in the present invention also provides the inherent wide-viewing-angle property, which is another very important requirement for TFT-LCD television sets (TVs).

Prior art research on fringing-field switching (FFS) has been published by Seung Ho Hong et al., *Japanese Journal of Applied Physics*, "Hybrid Aligned Fringing Field" Vol. 40, p.L272, (2001) and Seung Ho Hong et al., *Japanese Journal, Applied Physics*, Vol 41, pp. 4571-4576 (2001). The present invention adopts a structure that is very similar to the Fringing-Field-Switching FFS mode structure described by Seung Ho Hong et al. This mode was used for generating wide-viewing-angle using in-plane-switching with improved efficiency. By adopting this structure in the present invention, the required voltage can be reduced for generating the lateral or fringing field. The reduction in voltage is possible because the gap between electrodes for fringing field generation is small. Hence, the operating voltage is lowered. Moreover, the FFS structure can provide good uniform vertical field without a dead zone, which is defined as a gap between electrodes without an electric field. In the present invention, the gap between electrodes also has an electric field generated by a bottom substrate electrode configuration that consists of an electrode layer with gaps known as a discontinuous electrode separated from a continuous electrode layer by a electrical insulation layer. The segments of the discontinuous electrode are however all connected to the same transistor within a pixel. The bottom substrate electrode structure is similar to the structure of conventional FFS structure.

The present invention however has at least three important differences from the conventional FFS structure. First, the present invention has two common electrodes; whereas, the conventional FFS structure has only one common electrode of low voltage only. A recently reported FFS mode also used two common electrodes; however, in this case both common electrodes are of low voltage, e.g. 0V. In contrast, in the present invention, one common electrode is high voltage and one common electrode is low voltage. Second, the liquid crystal (LC) mode is different. Conventional FFS uses parallel alignment with in-plane-switching whereas the recently reported FFS mode with two common electrodes uses Hybrid-Aligned-Nematic (HAN). The present invention can use any liquid crystal mode and the wide-viewing-angle generation mechanism is also different compared with the FFS Prior Arts. Third, all prior art FFS structures have slow response time since they are not using the crossed-field effect and the turn-off process relies on natural relaxation of the LC molecules and is slow.

Further, prior art references relate to multi-domain technology LCDs. The present invention adopts a mechanism of forming wide-viewing-angle known as multi-domain. The present invention however has important differences from all the prior art using this technology since our invention uses FFS structure for generating the fringing field whereas other prior art references mainly use protrusions for generating multi-domains. See A. Takeda et al., *SID* '98, "MVA, Multi-Domain Vertical Alignment" p. 1077 (1998). An inter-digital structure for generating the fringing field to cause multi-domain was discussed by K. H. Kim et al., *SID* '98 p. 1085 (1998). Moreover, the present invention can use many different liquid crystal modes compared with mainly Vertical Alignment (VA) mode used in the prior art.

Thus, there is a need for improvement in today's thin-film transistor liquid crystal display (TFT-LCD) technology. It is desirable for crossed-field effect structures to have low operation voltage, high contrast, simple driving and easy fabrication. Faster response is desired for conventional structures using FFS or multi-domain LCDs.

The present invention affords a substantial improvement in the production and performance of TFT-LCDs. Different LC modes can be applied to this structure. Different LC modes can lead to different light efficiency, response time and viewing angle. The choice of the LC mode depends on the type of application.

SUMMARY OF THE INVENTION

The first objective of the present invention is to provide configurations and methods for using TFT-LCD (Thin Film Transistor Liquid Crystal Display) having fast response to high input data rate.

The second objective of the present invention is to provide configurations and methods for using TFT-LCD (Thin Film Transistor Liquid Crystal Display) having two common electrode, one of a lower voltage, e.g., 0V and one of a higher voltage, e.g., 5V and one pixel electrode so that both vertical and non-vertical fields can be generated to switch the liquid crystals at high rate.

The third objective of the present invention is to provide configurations and methods such that the crossed-field effect requires less voltage compared to conventional crossed-field devices and therefore can be applied to TFT-LCD (Thin Film Transistor Liquid Crystal Displays).

The fourth objective of the present invention is to provide configurations and methods such that the crossed-field effect allows simple driving scheme for use in TFT-LCD (Thin Film Transistor Liquid Crystal Display).

The fifth objective of the present invention is to provide configurations and methods such that the crossed-field effect has high contrast capability and simple fabrication process for the TFT-LCD (Thin Film Transistor Liquid Crystal Display)

The sixth objective of the present invention is to provide configurations and methods for using TFT-LCD (Thin Film Transistor Liquid Crystal Display) having wide viewing angles for viewers.

Further objects and advantages of this invention will be apparent from the following detailed description of a presently preferred embodiment, which is illustrated, schematically in the accompanying drawings.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

It should be noted that the present invention comprises a first substrate, a second substrate, a liquid crystal between the first and second substrates, a means for generating an electric field between electrode layers adjacent to both the first and second substrates. The unique features of the present invention are in the arrangement of electrode layers which are now described in detail.

Figure 10:
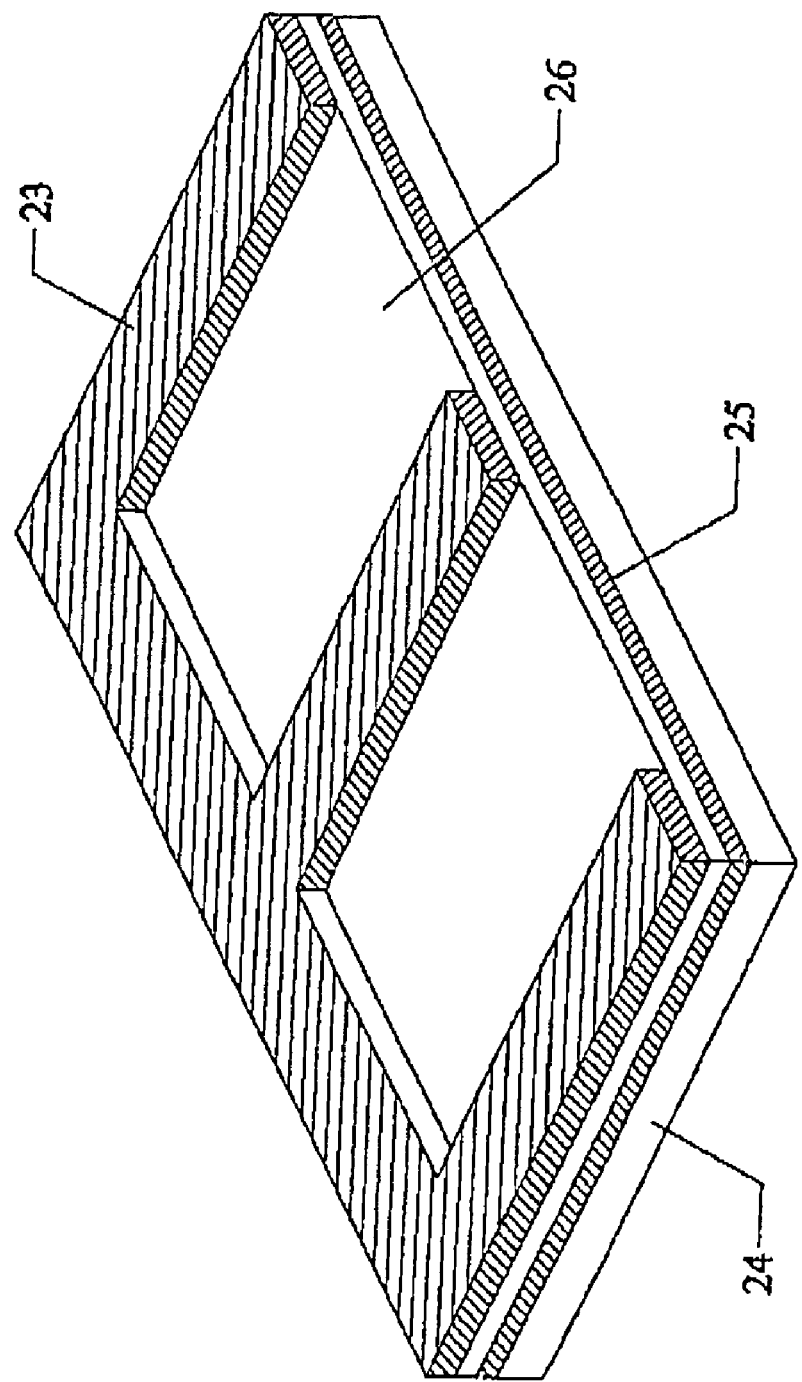
FIG. 10 is a front view of the TFT-LCD structure shown in FIG. 2.

There are common electrodes, which can be high voltage or low voltage, continuous or discontinuous, and the voltage applied does not depend on the input data during the operation of the TFT-LCD. There are pixel electrodes that can be continuous or discontinuous, and are the electrodes to which the voltage applied depends on the input data. A discontinuous electrode includes two or more adjacent finger-like extensions that are separated by a distance and connected together at one end. One common electrode can be located in the lower substrate or second substrate; in addition, a third electrode layer in the lower substrate can be discontinuous by design and collectively referred to as one layer, using one numerical reference in all figures presented herein. For example, FIG. 4 and FIG. 10 show a discontinuous common electrode layer 23 having three finger-like extensions separated by a distance and connected together at one end.

It was not obvious that the combination of two common electrodes with unequal voltages and one pixel electrode would provide a TFT-LCD having fast response and wide viewing angle when varying voltage is applied to the pixel electrode. The fast response is achieved when both the turn on and turn off modes of the device are driven by an electric field; with an electric field the LC molecules can both align and relax very quickly.

Figure 1:
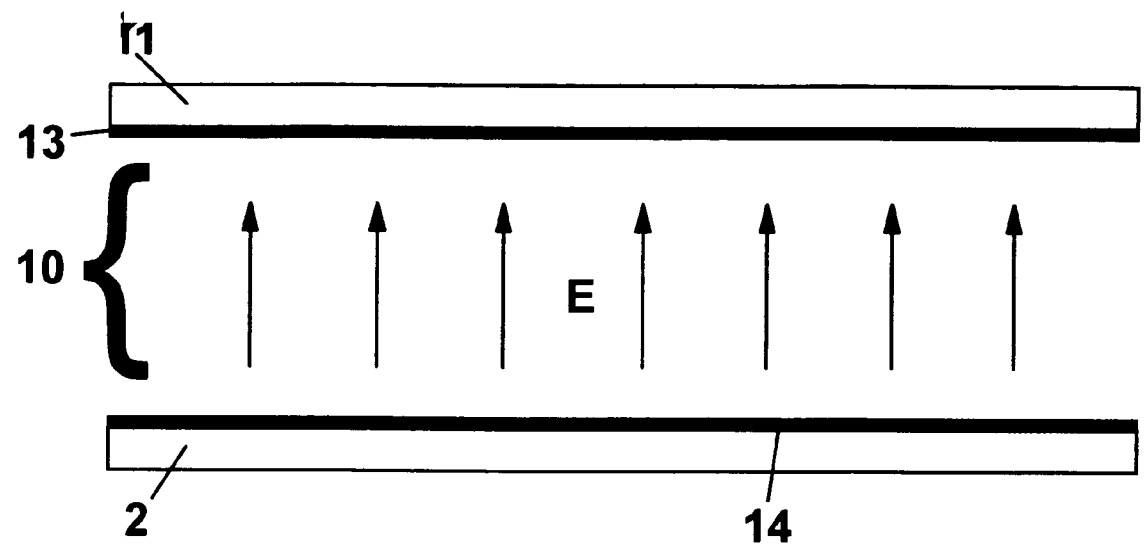
FIG. 1 shows a conventional prior art TFT-LCD structure with one common electrode.
Figure 2:
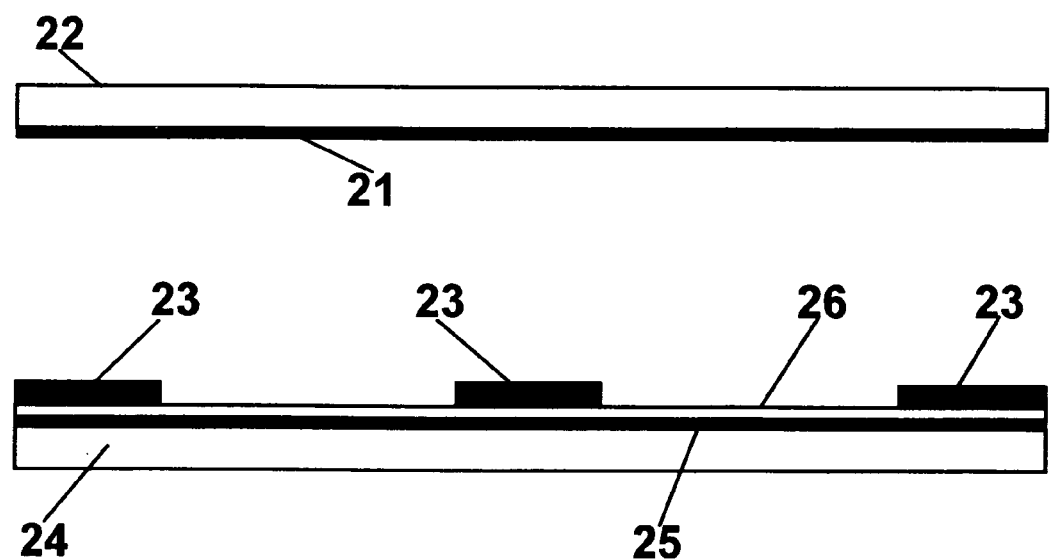
FIG. 2 shows a preferred embodiment of the novel TFT-LCD structure with two common electrodes and one pixel electrode layer.
Figure 3:
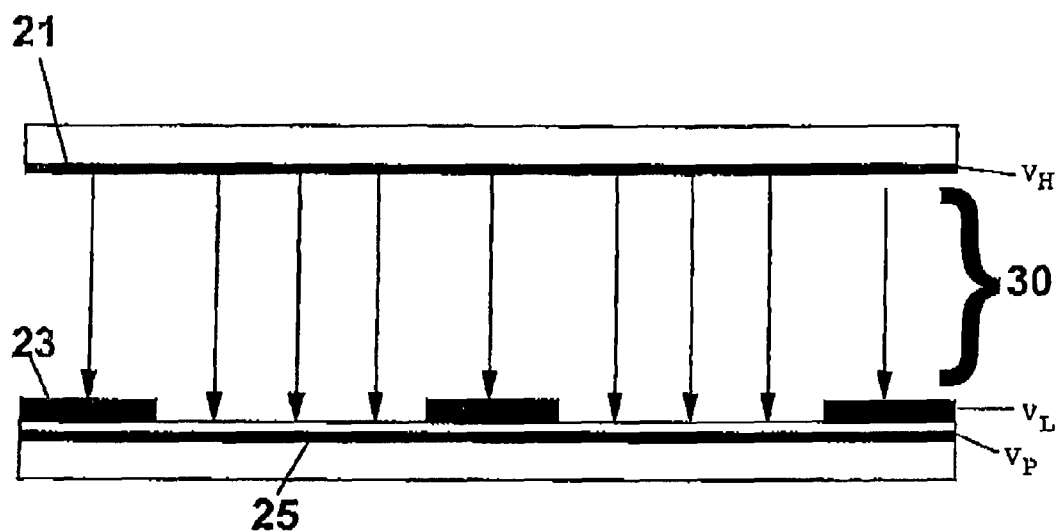
FIG. 3 shows the TFT-LCD structure of FIG. 2 with uniform vertical field generated when the pixel voltage is 0V (dark state).

FIG. 2 shows cross sectional view of a novel design of the TFT-LCD structure of the present invention and Figure LO shows a front view of the structure shown in FIG. 2. A major novel feature of this design is that instead of just having one common electrode, there arc two common electrodes 21, 23, one of a lower voltage, e.g. 0V and one of a higher voltage, e.g. 5V. In FIG. 3, the first common electrode layer 21 in the top substrate 22 has a constant high voltage of 5V whereas the second common electrode layer 23 in the bottom substrate 24 has a lower voltage of 0V. Common electrode 23 is separated from the pixel electrode 25 by a passivation layer 26, which is an electrical insulation layer. When a low voltage of 0V is applied to pixel electrode 25, a uniform vertical field 30 is generated as shown in FIG. 3. This uniform vertical field generated when the pixel voltage is 0V usually leads to a dark state and has very fast switching since it is electric-field driven. This is similar to the fast switching produced by the vertical Field generated in the conventional TFT-LCD devices.

Figure 4:
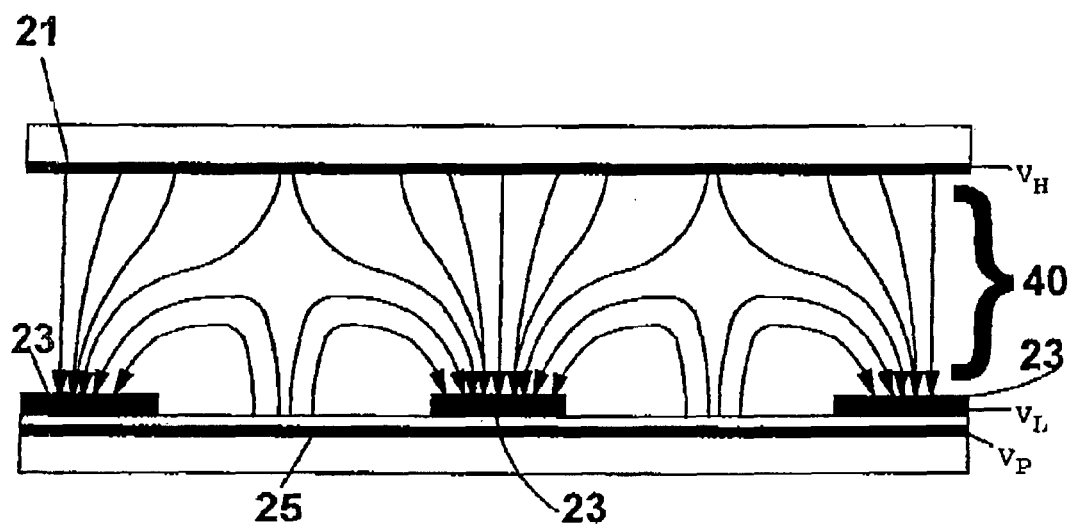
FIG. 4 shows the TFT-LCD structure of FIG. 2 with a new electric field pattern generated when the pixel voltage is 5V (bright state).

In FIG. 4, when the pixel voltage is 5V there is a bright state. Voltage of 5V is applied to pixel electrode 25; a new electric field pattern 40 is established quickly due to the fringing field shown in FIG. 4. The continuous common electrode 21 in the top substrate has a voltage of 5V, while the discontinuous common electrode layer 23 in the bottom substrate has a voltage of 0V and the pixel electrode 25 has a voltage of 5V, as mentioned earlier. This leads to a new liquid crystal alignment state with different optical transmission, usually a bright state. The switching speed to this new state is also fast since it is driven by the electric field. Therefore, this new structure of TFT-LCD design leads to both fast turn-on and turn-off speeds since they both are electric-field driven.

EXAMPLE 1

Lower Voltage for One Common Electrode

The voltage for common electrode 21 in FIG. 2 is 5V; this voltage can be made lower in order to reduce the vertical electric field strength and hence strengthen the lateral field. This can help improve the light efficiency since the lateral field becomes stronger and more molecules are switched to the bright state. This will however increase the corresponding response time for the bright-to-dark state due to the formation of a weaker vertical field. The remaining voltage readings are for common electrode 23 on bottom substrate 24, V=0V; for pixel electrode 25 V=0 to 5V. Common electrode 23 is electrically insulated from the pixel electrode 25 by a passivation layer 26.

EXAMPLE 2

Higher Voltage to Bottom Electrode

Figure 5:
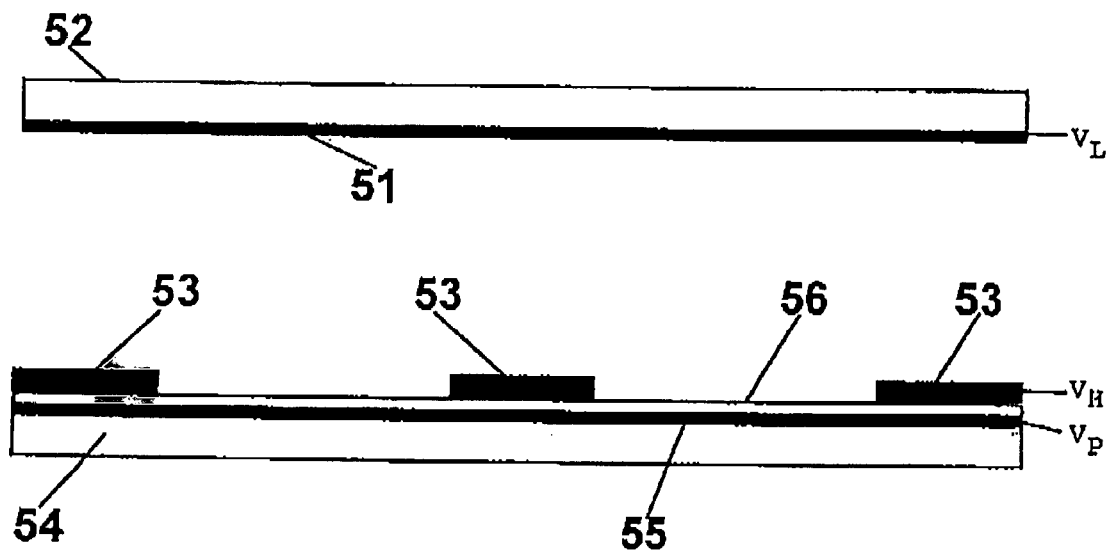
FIG. 5 shows a second preferred embodiment of the novel TFT-LCD structure.
Figure 11:
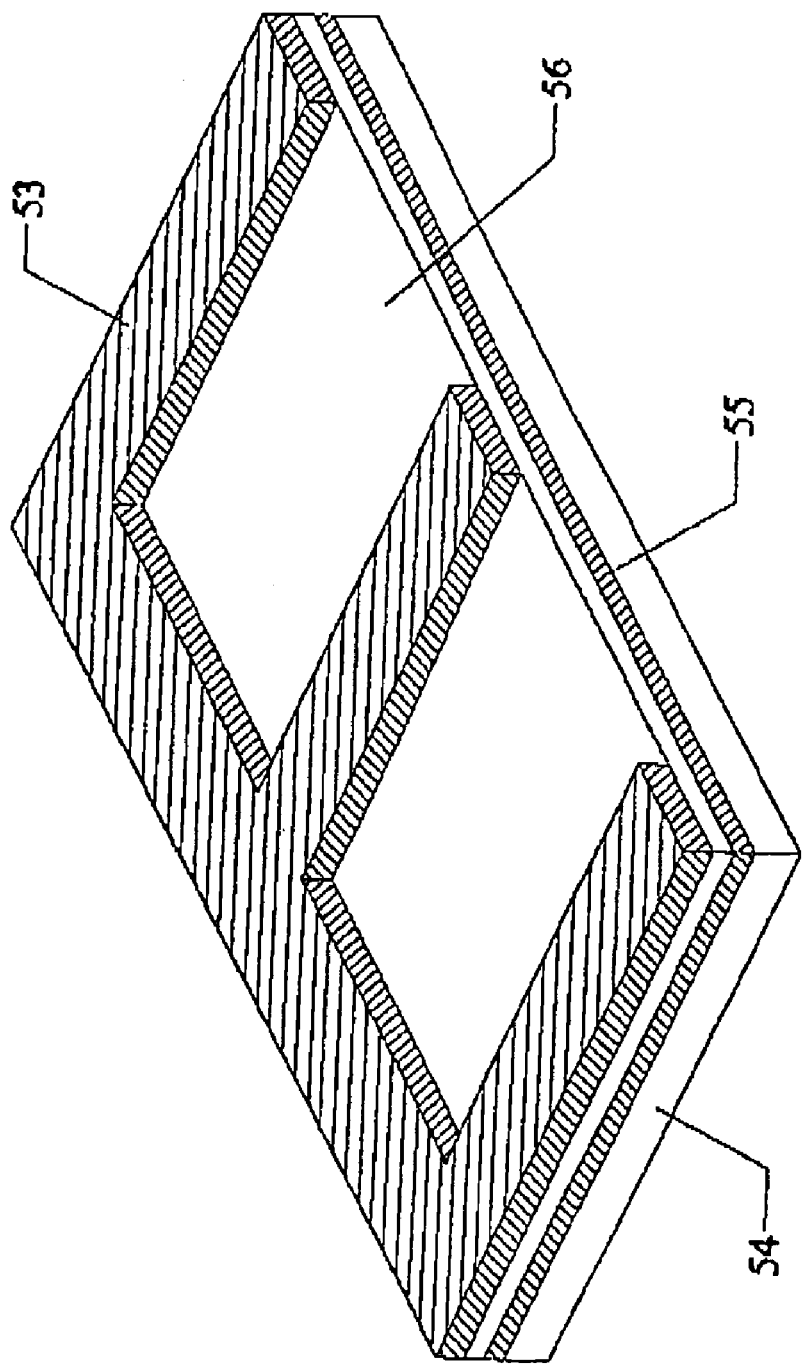
FIG. 11 is a front view of the TFT-LCD structure shown in FIG. 5.
Figure 12:
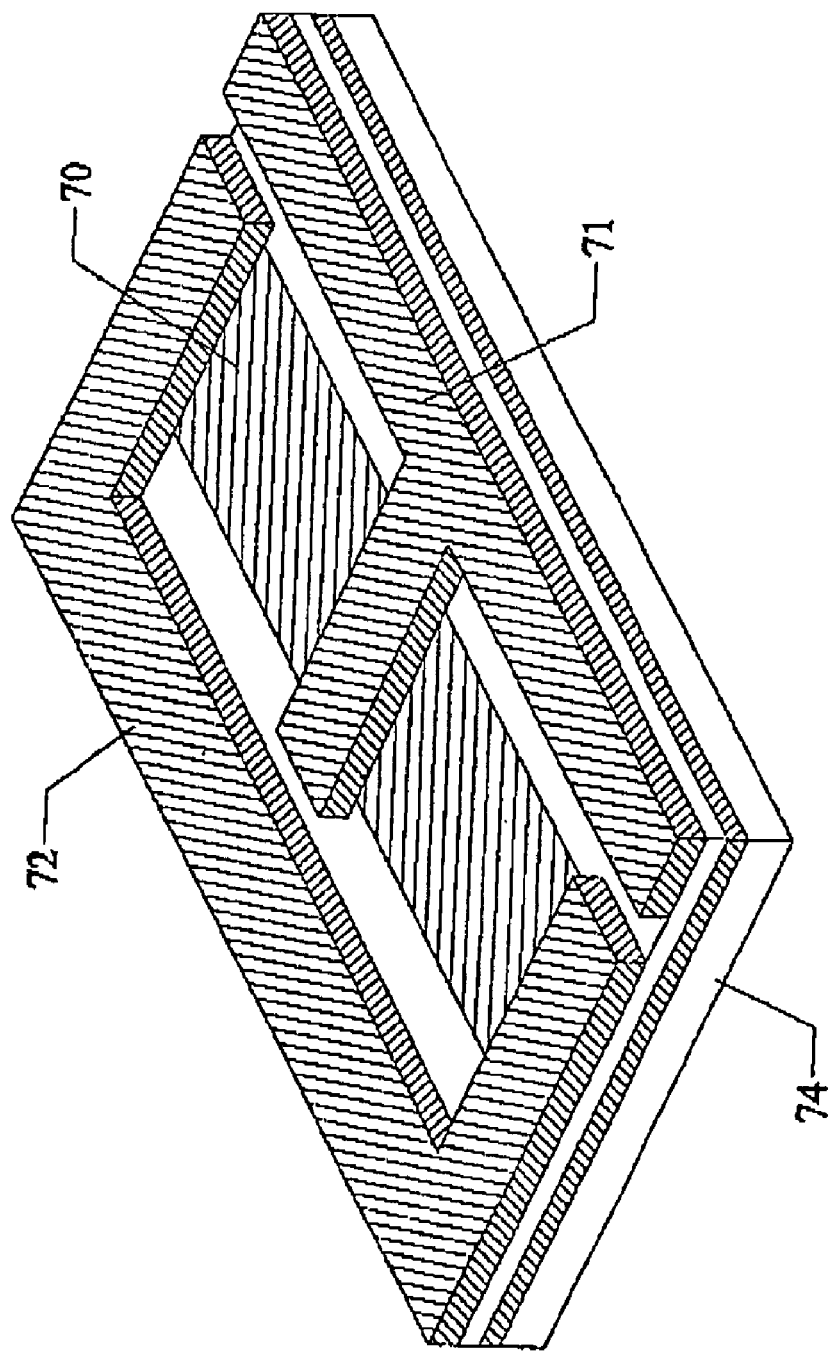
FIG. 12 is a front view of the TFT-LCD structure shown in FIG. 7.

In FIG. 2, common electrode 21 has higher voltage; whereas, common electrode 23 has lower voltage and in principle these two electrodes can be interchanged. This interchange is shown in FIG. 5 which is a cross section view of the TFT-LCD structure and FIG. 11 which shows a front view of the structure shown in FIG. 5. In FIG. 5, the first common electrode 51 on top substrate 52 has a lower voltage (0V); whereas the second common electrode layer 53 in the bottom substrate 54 has a high voltage (5V). This alternative design may lead to a less uniform vertical field because of the slightly higher potential difference that is caused by a passivation layer 56. In FIG. 5, a high electric field is emitted from pixel electrode 55 and hence a higher electric field is established across the passivation layer 56 than when the electric field is emitted from the top electrode 51. It should be noted, that the terminology "passivation layer" in the description of the present invention, is commonly known as an insulation layer. However, the potential difference that is established between pixel electrode 55 and second common electrode layer 53 can principle be reduced by altering the voltage to second common electrode 53 or voltage to the pixel electrode 55 in order to compensate for the voltage drop.

EXAMPLE 3

Common Electrode and Pixel Electrode Interchanged

Figure 6:
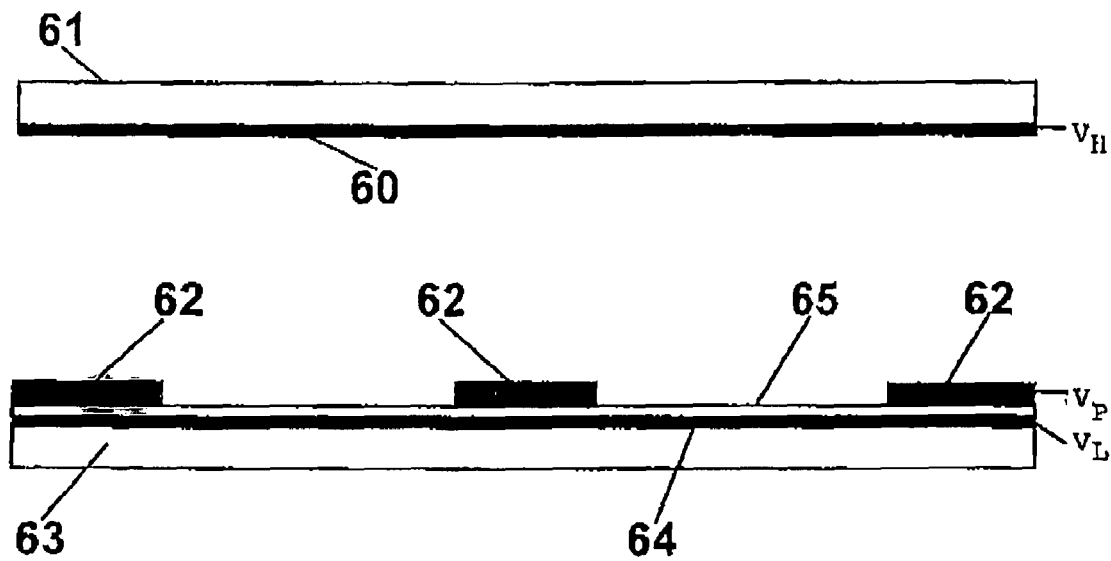
FIG. 6 shows the TFT-LCD structure of FIG. 5 with power being applied to different electrode layers.

A first common electrode layer 60 with 5V is in top substrate 61 as shown in FIG. 6. The bottom substrate 63 supports a pixel electrode layer 62 with 0 to 5V and a second common electrode layer 64 with 0V. The pixel electrode layer 62 is electrically insulated from the common electrode 64 by a passivation layer 65. The positions of common electrode 64 and the pixel electrode 62 in this configuration are interchanged compared with the configuration shown in FIG. 2. The choice of the configuration depends on the fabrication process capability and the optimized electrode width and gap.

EXAMPLE 4

Use of Resistive Film

Figure 7:
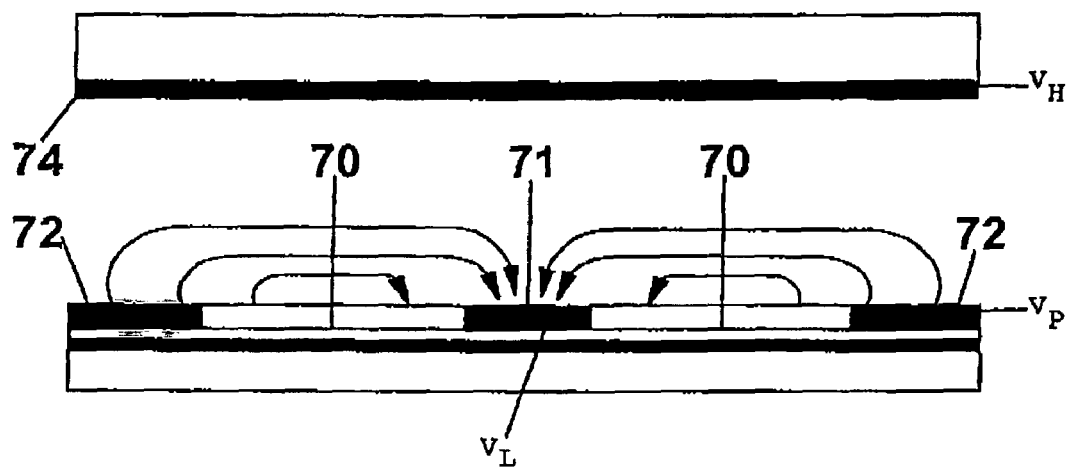
FIG. 7 shows a third embodiment using a resistive film with two common electrode.

In order to extend the distance of the lateral field, a resistive film 70 can be used to connect the pixel electrode and second common electrode in the bottom substrate as shown in FIG. 7. A potential gradient is developed between the pixel electrode 72 and second common electrode 71 across the resistive film when the pixel voltage is high. A lateral field is established between the pixel electrode 72 and the second common electrode 71 to switch the LC molecules during the bright state. The first common electrode 74 in the upper substrate has a high voltage of e.g. 5V. This voltage can, however, be reduced to e.g. 2V in order to increase the lateral field strength. On the other hand, when the voltage of pixel electrode 72 is the same as the voltage in common electrode 71, then there will be no potential difference across the resistive film and a constant uniform potential appears across the film, due to conductive electrons. FIG. 7 illustrates that there can be a horizontal electric field generated between pixel electrode 72 and second common electrode 71 which results in a longer lateral fringing field and higher efficiency for the bright state.

EXAMPLE 5

Use of Dielectric Layer

Figure 8:
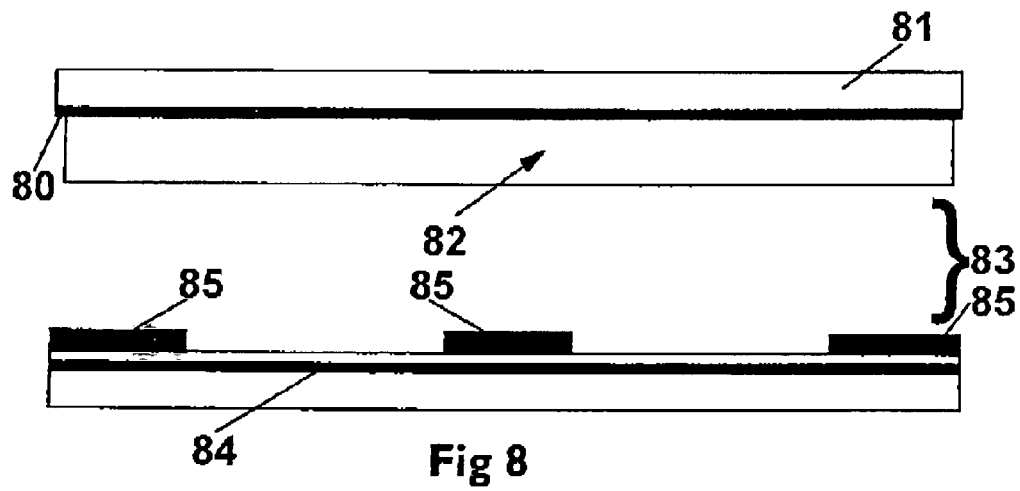
FIG. 8 shows a fourth embodiment using a dielectric layer with the novel configuration of FIG. 2.

As shown in FIG. 8, when common electrode layer 80 of the top substrate 81 is 0V, the use of a dielectric layer 82 between common electrode layer 80 and LC layer 83 can increase the lateral field strength in the upper section of the LC cell since the 0V in top substrate is now further away from the bottom electric field. The dielectric layer 82 is adjacent to the common electrode layer 80. The dielectric layer functions to keep the cell gap small and help make the lateral fringing field stronger because the upper electrode is figuratively further away. The fringing field formed between common electrode layer 84 and pixel electrode layer 85 becomes stronger, thus improving the light efficiency.

EXAMPLE 6

Natural Wide-Viewing-Angle Formation

Figure 9:
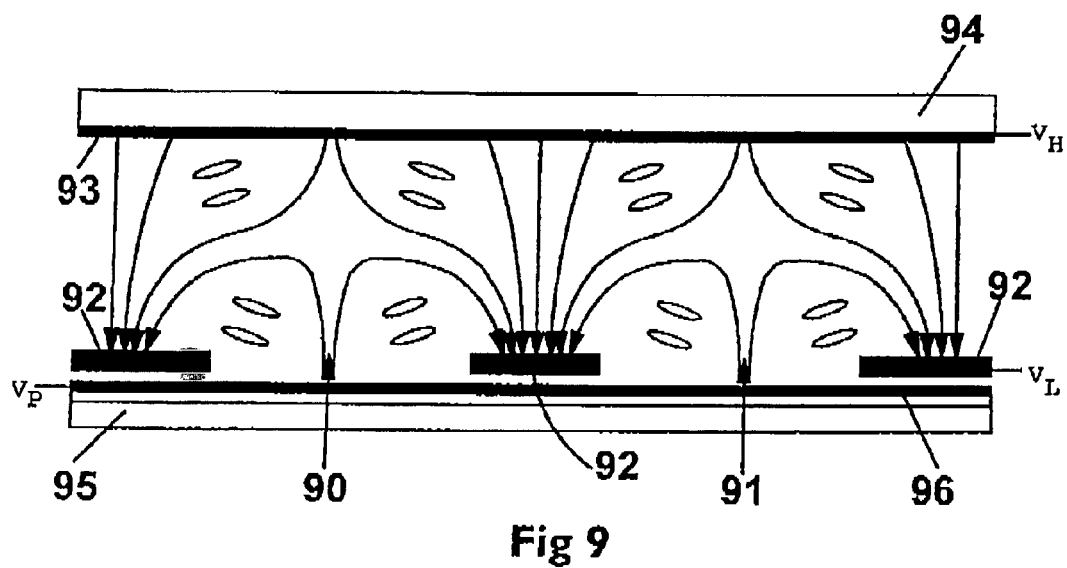
FIG. 9 shows the non-vertical electric field pattern generated with the novel structures.
Figure 13:
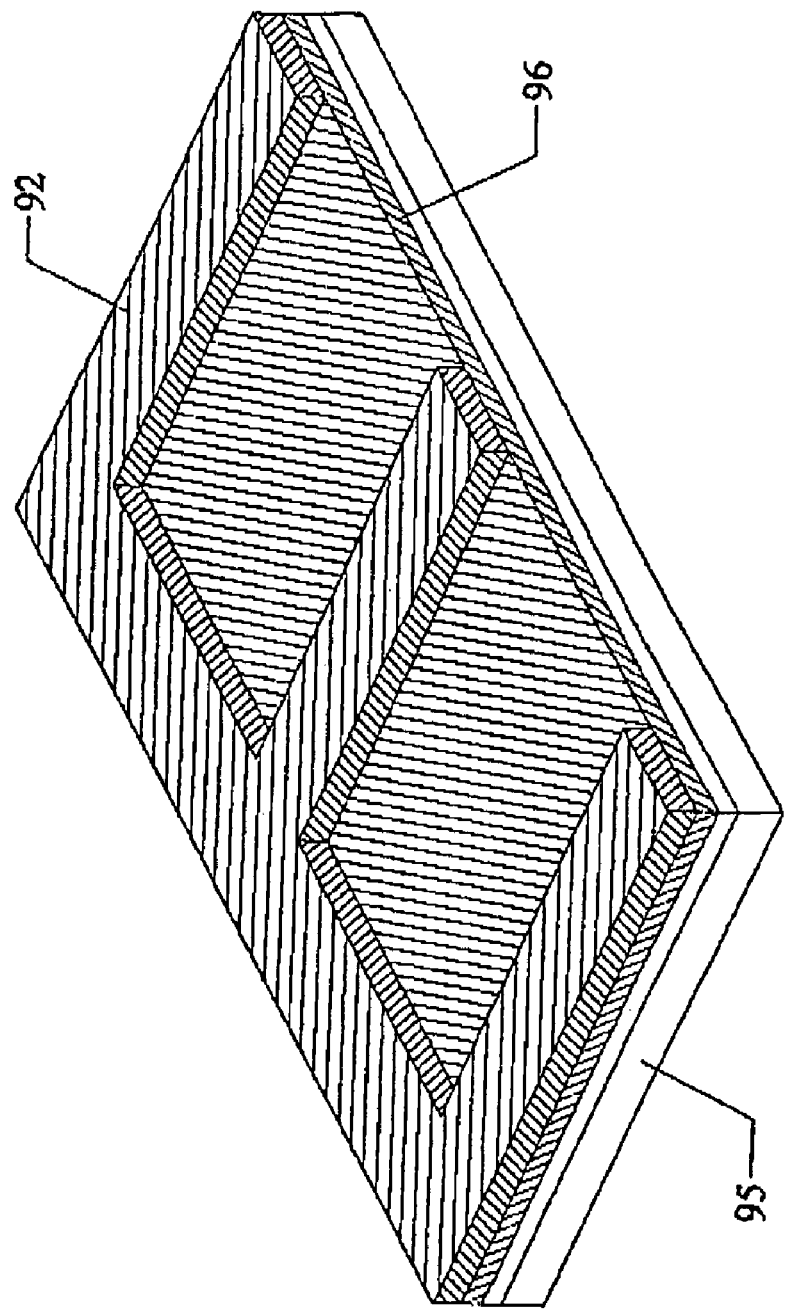
FIG. 13 is a front view of the TFT-LCD structure shown in FIG. 9.

FIG. 9 is a cross sectional view showing that the fringing field leads to the formation of multi-domains which are symmetrical about the mid-plane of the gap 90, 91 between the second common electrode layer 92. FIG. 13 is a front view of the of the structure shown in FIG. 9. This multi-domain formation will lead to wide viewing angle in two directions, left-right or up-down. It can lead to wide-viewing-angle in all four directions by adopting a zig-zig eletrode structure known as the Multi-domain Vertical Alignment (MVA). FIG. 9 shows the natural formation of multi-domains due to the symmetrical fringing pattern when the first common electrode layer 93 in the top substrate 94 has 5V and the second discontinuous common electrode layer 92 in the bottom substrate 95 has 0V and the voltage in the pixel electrode 96 is 5V. FIG. 9 is the same configuration as FIG. 4, with the added illustration of how the fringing field allows different poses for the LC molecule resulting in a naturally wide viewing angle.

The detailed description, examples and simulation results of the invention provide a means for advancing the knowledge and development of thin film transistor liquid crystal display technology. The novel features of this invention, include, but are not limited to, employing crossed-field effect in TFT-LCD; combining the crossed-field effect with wide-viewing-angle for faster response and wider viewing angle; using a two common-electrode structure of both high and low voltages; using a novel structure for generating crossed-field effect; using a novel structure for generating multi-domain LCDs.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A thin film transistor liquid crystal display having fast response and wide viewing angle, comprising:
   a first substrate with a continuous first common electrode layer;
   a second substrate with both a continuous pixel electrode layer and a discontinuous second common electrode layer located above the continuous pixel electrode, wherein the discontinuous second common electrode layer includes plural finger-like second common electrodes extensions connected at one end and open at the opposite end and having a gap between adjacent second common electrodes finger-like extensions;
   liquid crystal between the first substrate and the second substrate; and
   means for generating an electric field between the first common electrode layer in the first substrate and both the continuous pixel electrode layer and the discontinuous second common electrode layer in the second substrate by applying a first voltage to the continuous first common electrode layer and the continuous pixel electrode layer a second voltage not equal to the first voltage applied to the discontinuous second common electrode layer to generate the a non-vertical electric field between the first continuous common electrode layer on the first substrate and both the continuous pixel electrode layer and the discontinuous second common electrode layer in the second substrate during the bright state and applying the first voltage to the first continuous common electrode and the second voltage to the discontinuous second common electrode layer and the continuous pixel electrode layer for a uniform vertical electric field for a dark state, the first and second voltages not dependent on the input data, for a crossed-field effect in the thin film transistor liquid crystal display so that the display provides fast response to high input data rates and allows for wide viewing angles for viewers.

2. The display of claim 1, wherein the electric field generating means has:
   the discontinuous second common electrode layer separated from the pixel electrode layer by an insulation layer in the second substrate.

3. The display of claim 2, further comprising:
   a dielectric layer adjacent to the continuous first common electrode to increase a lateral field strength in an upper portion of the liquid crystal to improve a light efficiency of the thin film transistor liquid crystal display.

4. The display of claim 1, further comprising:
   means for supplying a voltage source to the continuous pixel electrode layer.

5. The display of claim 1, wherein the first voltage applied to the continuous first common electrode is higher than the second voltage applied to the discontinuous second common electrode layer.

6. The display of claim 1, wherein the second voltage applied to the discontinuous second common electrode layer is higher than the first voltage applied to the continuous first common electrode layer.

7. A method of providing fast response and wide viewing angle to thin film transistor liquid crystals displays, comprising the steps of:
   providing a liquid crystal layer between a first substrate and a second substrate; and
   generating an electric field in the liquid crystal layer between the first and second substrates, wherein a first voltage is applied to a continuous first common electrode layer on the first substrate, and a second voltage not equal to the first voltage is applied to a discontinuous second common electrode layer having plural spaced apart second common electrodes on the second substrate, the first and second voltages not dependent on the input data, and applying a third voltage that depends on the input data to a pixel electrode layer positioned below the discontinuous second common electrode on the second substrate, wherein when the third voltage is approximately equal to the first voltage a non-uniform electric field is generated for a bright state and when the third voltage is approximately equal to the second voltage a uniform electric field is generated for a dark state for a crossed-field effect in the thin film transistor liquid crystal display for fast responses to input data and wide viewing angles for viewers.

8. The method of claim 7, wherein the step of generating a non-vertical electric field includes the step of:
   forming a discontinuous pixel electrode layer having plural spaced apart pixel electrodes alternating with the plural spaced apart second common electrodes so that each one of the plural pixel electrodes is adjacent to one of the plural second common electrodes in the same plane; and
   forming a resistive layer between the discontinuous pixel electrode layer and the discontinuous second common electrode layer, wherein the discontinuous pixel electrode layer and alternating adjacent discontinuous second common electrode layer are adjacent to the liquid crystal layer; and
   applying the third voltage to the discontinuous pixel electrode layer that is equal to the second voltage so that a horizontal electric field is generated between the discontinuous pixel electrode layer and the discontinuous second common electrode layer so that a longer lateral electric field occurs.

9. A thin film transistor liquid crystal display having fast response and wide viewing angle, comprising:

a first substrate with a continuous first common electrode layer;

a second substrate with both a discontinuous pixel electrode layer having plural spaced apart pixel electrodes and a discontinuous second common electrode layer having plural spaced apart second common electrodes, wherein the each one of the plural pixel electrodes alternates with an adjacent one of the plural common electrodes in the same plane and having a gap therebetween;

liquid crystal between the first substrate and the second substrate; and means for generating an electric field between the first and second substrate by applying a first voltage to the continuous first common electrode layer and applying a second voltage not equal to the first voltage to the discontinuous second common electrode layer, the first and second voltages not dependent on the input data, and applying a third input data dependent voltage to the continuous pixel electrode to generate a non-uniform electric field when the third voltage is approximately equal to the first voltage for a bright state and a uniform electric field when the third voltage is approximately equal to the second voltage for a dark state for a crossed-field effect in the thin film transistor liquid crystal display so that the display provides fast response to high input data rates and allows for wide viewing angles for viewers.

* * * * *